US008477126B2

(12) United States Patent
Kudo et al.

(10) Patent No.: US 8,477,126 B2
(45) **Date of Patent: *Jul. 2, 2013**

(54) DISPLAY DRIVER AND DISPLAY DRIVING METHOD

(75) Inventors: Yasuyuki Kudo, Fujisawa (JP); Akihito Akai, Yokohama (JP); Goro Sakamaki, Fuchu (JP)

(73) Assignee: Renesas Electronics Corporation, Kanagawa (JP)

( * ) Notice: Subject to any disclaimer, the term of this patent is extended or adjusted under 35 U.S.C. 154(b) by 589 days.

This patent is subject to a terminal disclaimer.

(21) Appl. No.: 12/722,150

(22) Filed: Mar. 11, 2010

(65) Prior Publication Data

US 2010/0165011 A1 Jul. 1, 2010

Related U.S. Application Data

(63) Continuation of application No. 11/286,429, filed on Nov. 25, 2005, now Pat. No. 7,692,641.

(30) Foreign Application Priority Data

Mar. 24, 2005 (JP) ................................ 2005-086878

(51) Int. Cl.

| | |
|---|---|
| ***G06F 3/038*** | (2006.01) |
| ***G09G 5/00*** | (2006.01) |
| ***G09G 3/36*** | (2006.01) |
| ***G09G 3/10*** | (2006.01) |

(52) U.S. Cl.
USPC .............. 345/208; 345/88; 345/99; 345/204; 345/215; 315/169.3

(58) Field of Classification Search
USPC ........................................................ 345/208
See application file for complete search history.

(56) References Cited

U.S. PATENT DOCUMENTS

| | | | |
|---|---|---|---|
| 6,731,266 | B1 | 5/2004 | Jung |
| 6,836,074 | B2 | 12/2004 | Nakamura |
| 2006/0176256 | A1 | 8/2006 | Yen et al. |

FOREIGN PATENT DOCUMENTS

| | | |
|---|---|---|
| JP | 2003-131625 | 5/2003 |
| JP | 2004-093887 | 3/2004 |
| JP | 2004-191544 | 7/2004 |
| JP | 2005-351963 | 12/2005 |

OTHER PUBLICATIONS

Office Action in Japanese Patent Application 2005-086878, dated Jul. 20, 2010, (3 pages, in Japanese).

*Primary Examiner* — Charles V Hicks
(74) *Attorney, Agent, or Firm* — Antonelli, Terry, Stout & Kraus, LLP.

(57) ABSTRACT

In a display driver, one scanning period is divided into a period P and a subsequent period D. In the period P, a pre-charge voltage equal to an original data voltage is applied in a time-sharing manner to data lines in one block, and in the period D after the period P, the original data voltage is applied again.

3 Claims, 10 Drawing Sheets

DISPLAY DRIVER AND DISPLAY DRIVING METHOD

CROSS-REFERENCE TO RELATED APPLICATION

This application is a continuation application of U.S. Ser. No. 11/286,429, filed Nov. 25, 2005 now U.S. Pat. No. 7,692,641, and which application claims priority from Japanese Patent Application No. JP 2005-86878 filed on Mar. 24, 2005, the contents of which are hereby incorporated by reference into this application.

TECHNICAL FIELD OF THE INVENTION

The present invention relates to a display driver for an active matrix display using a TFT liquid crystal or the like. More particularly, it relates to a technology effectively applied to a driving method and a drive circuit which can suppress a fluctuation of data voltage held in a data line, in a drive system in which the data voltage is outputted in a time-sharing manner in one horizontal period.

BACKGROUND OF THE INVENTION

In general, in the active matrix display in which a plurality of scanning lines and a plurality of data lines are arranged in a matrix shape, a scanning voltage showing a selected state is sequentially applied to the scanning line in each one scanning period, and a data voltage corresponding to the display data on the selected scanning line is applied to the data line. In this case, as a method for reducing a circuit scale of the data line drive circuit, a method of driving the data line in a time-sharing manner within one scanning period has been known. In this method, a plurality of data lines are set as one block, a circuit (multiplexer) which outputs the data voltage corresponding to the data lines in one block in a time-sharing manner is provided, a circuit (demultiplexer) which distributes the outputted data voltage is provided, and the data voltage is sequentially applied to the data lines in one block. In accordance with this method, since it is possible to drive a plurality of data lines by one drive circuit, it is possible to achieve a circuit scale saving.

However, in the system mentioned above, since the data line in which the application of the data voltage is completed becomes in a floating state, there is a problem that a holding potential is changed due to the influence of the subsequent data voltage outputs. This is because of the capacity coupling between the adjacent data lines. As a method for improving this, there is an electro-optic apparatus described in Japanese Patent Application Laid-Open Publication No. 2004-191544. This electro-optic apparatus is characterized in that a pre-charge period (hereinafter, referred to as a period P) in which a pre-charge voltage is applied to all the data lines in one block at the time of starting one scanning period is provided, and the pre-charge voltage is an average of the data voltages to be applied. In accordance with this method, a voltage closer to an original data voltage is already applied to the data line in the subsequent time-sharing drive period (hereinafter, referred to as a period D), and a potential fluctuation until reaching the original data voltage is reduced. In the case where the potential fluctuation of the data line is small, the influence to the other data lines which are capacity-coupled thereto is also reduced. Accordingly, the problem mentioned above can be solved, that is, it is possible to reduce the fluctuation of the holding potential of the data line in a floating state.

SUMMARY OF THE INVENTION

However, in the method described in Japanese Patent Application Laid-Open Publication No. 2004-191544 mentioned above, since it is necessary to newly add a circuit for calculating the average value of the data voltages, there is a problem that a circuit scale is increased. Further, since such a case may occur where a data voltage largely deviated from the average value is applied depending on a display data, there is a problem that a display pattern dependency affects the effect of reducing the holding potential fluctuation.

Accordingly, an object of the present invention is to provide a display driver, which can reduce a holding potential fluctuation of a data line without adding any new circuit and without depending on a display pattern.

As mentioned above, in order to reduce the fluctuation of the holding potential of the data line in the floating state, it is effective to reduce the potential difference between the pre-charge voltage and the original data voltage. In other words, the fluctuation of the holding potential can be dissolved if the pre-charge voltage can be made equal to the original data voltage. Paying attention to this point, in the display driver according to the present invention, a pre-charge voltage equal to an original data voltage is applied to data lines in one block in a time-sharing manner in a period P, and the original data voltage is applied again in a time-sharing manner in the subsequent period D. Accordingly, paying attention to a certain data line, the same data voltage is applied twice within one scanning period. Therefore, the pre-charge voltage and the original data voltage become equal, and it is possible to dissolve the fluctuation of the holding potential.

According to the present invention, since it is possible to make the pre-charge voltage equal to the original data voltage in all the data lines only by changing the output operation of the data voltage in the time-sharing drive, it is possible to provide the display driver which can reduce the holding potential fluctuation of the data line without newly adding the circuit and without depending on the display pattern.

BRIEF DESCRIPTIONS OF THE DRAWINGS

Figure 11:
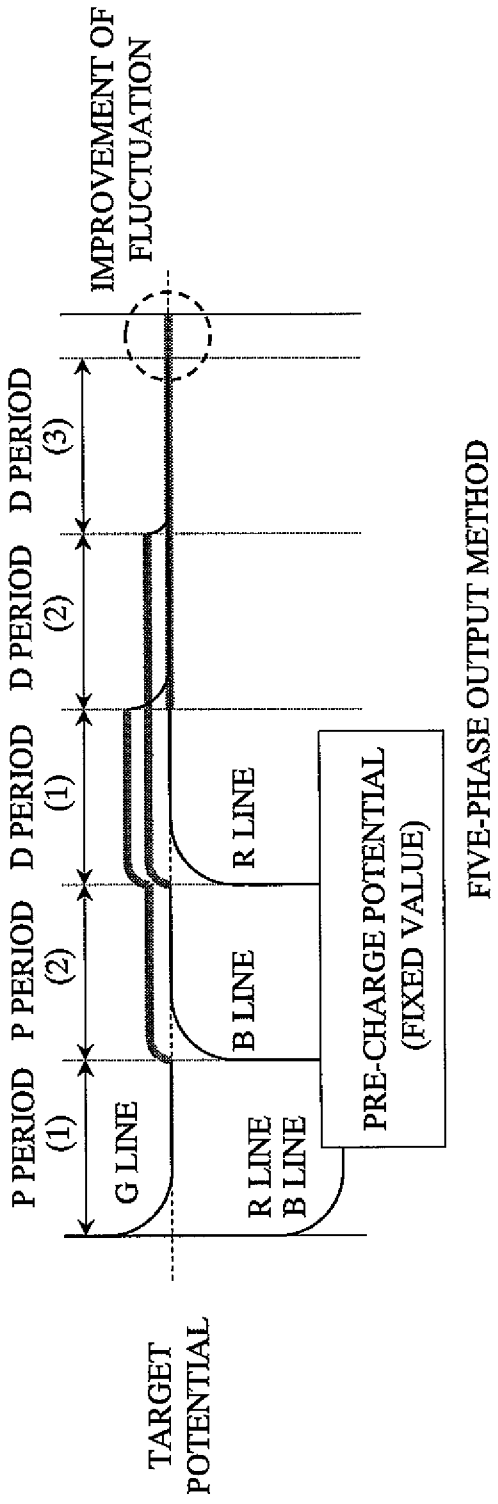
Figure 12:
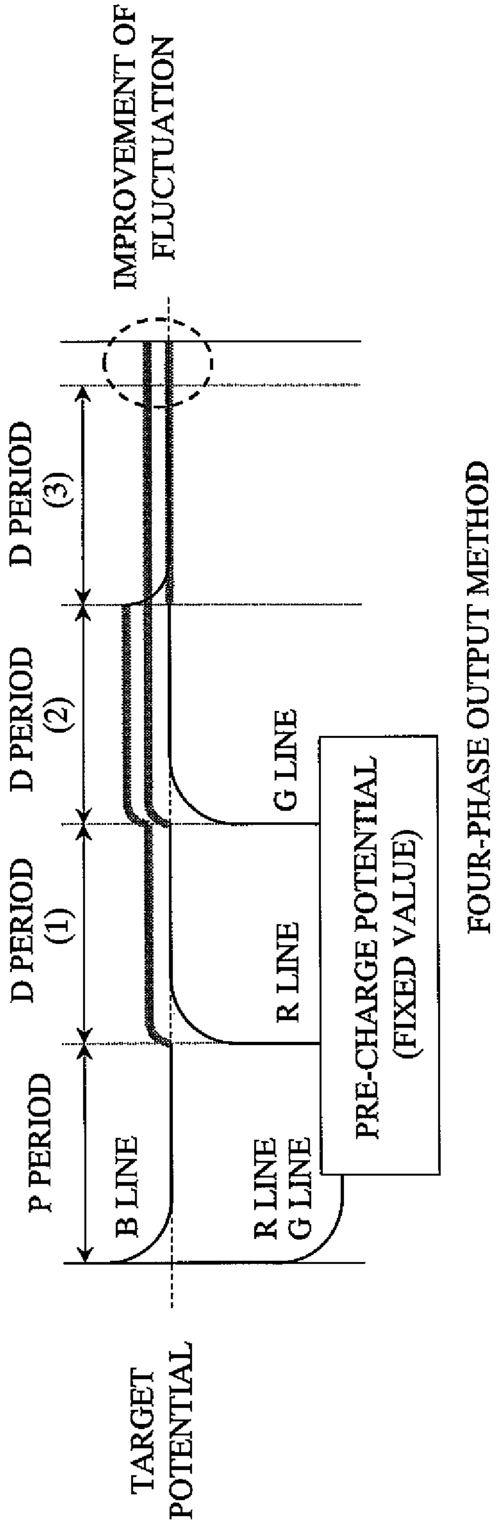

FIG. 11 is a diagram showing a five-phase output method, in which images of a fluctuation amount of a data line holding potential in each method are shown, in the display drivers according to the first to fourth embodiments of the present invention; and FIG. 12 is a diagram showing a four-phase output method, in which images of a fluctuation amount of a data line holding potential in each method are shown, in the display drivers according to the first to fourth embodiments of the present invention.

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

A configuration and an operation of a display driver according to a first embodiment of the present invention will be described below with reference to FIG. 1 and FIG. 2.

Figure 1:
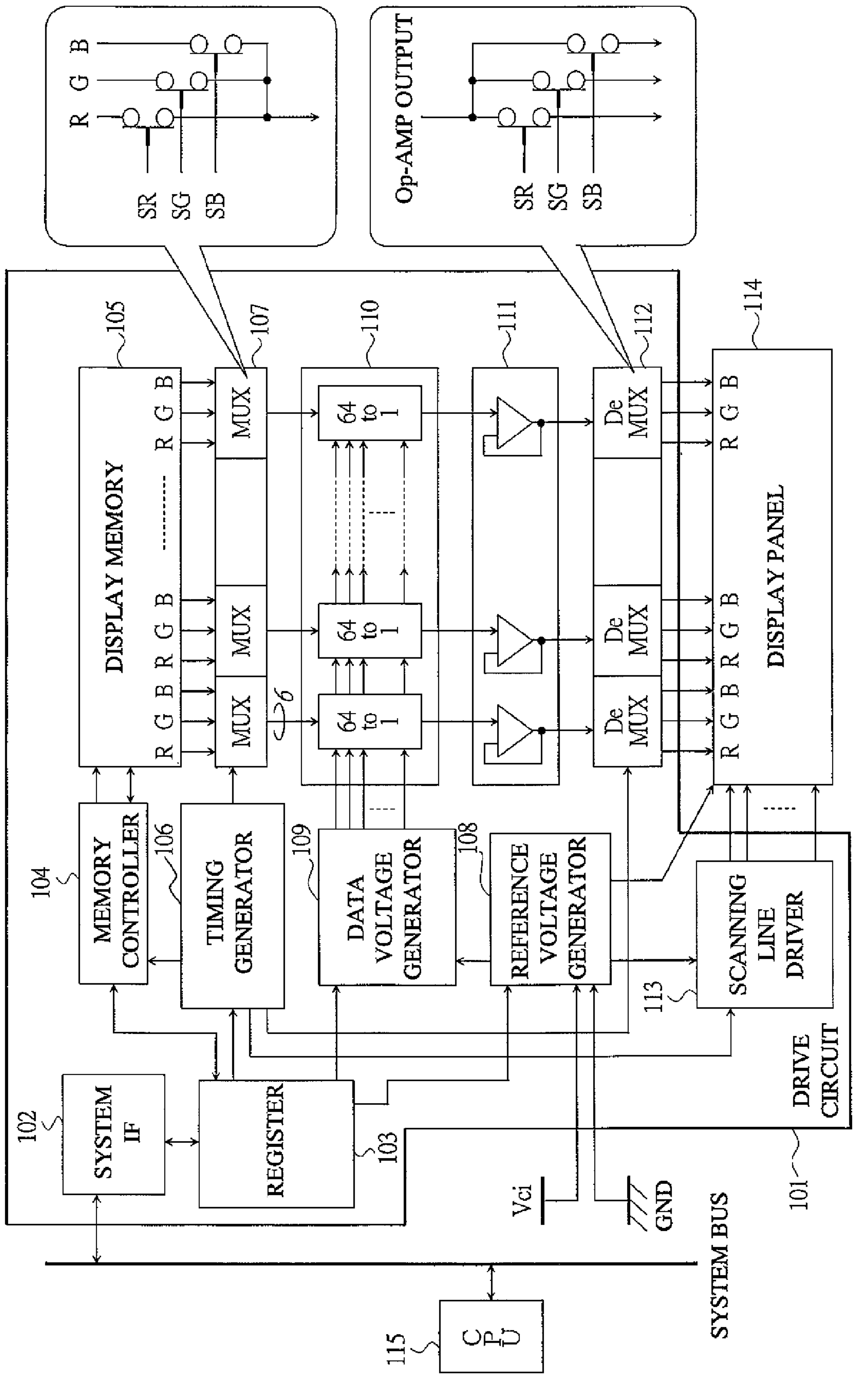
FIG. 1 is a diagram showing a block configuration of a display driver according to a first embodiment of the present invention.

First, FIG. 1 shows a block configuration of a display driver according to a first embodiment of the present invention. In FIG. 1, a reference numeral 101 denotes a drive circuit, 102 denotes a system interface (IF), 103 denotes a register, 104 denotes a memory controller, 105 denotes a display memory, 106 denotes a timing generator, 107 denotes a multiplexer (MUX), 108 denotes a reference voltage generator, 109 denotes a data voltage generator, 110 denotes a data voltage selector (64 to 1), 111 denotes an operational amplifier (Op-AMP), 112 denotes a demultiplexer (DeMUX), 113 denotes a scanning line driver, 114 denotes a display panel, and 115 denotes a CPU.

The drive circuit 101 is a so-called display memory built-in type controller driver, and it includes achieving means according to the present invention. In this case, the drive circuit 101 according to the present invention is not limited to the display memory built-in type, but can be applied to a type in which a memory is not built. Further, in this embodiment, the number of the data lines in one block is set to three, and they correspond to an R line (red display), a G line (green display) and a B line (blue display). Further, in this embodiment, tone information included in the display data is set to 6 bits in each of RGB (64 tones).

A configuration and an operation of an internal block of the drive circuit 101 will be described below.

The system interface 102 receives a display data and an instruction outputted by the CPU 115 and outputs them to the register 103. In this case, the instruction indicates the information for determining an internal operation of the drive circuit 101, and includes various parameters such as a frame frequency, the number of drive lines, a driving voltage and the like. Further, the information relating to a length of each period of a time-sharing drive which is a feature of the present invention is also included in the instruction.

The register 103 is a block which stores the data of the instruction and outputs it to each of the blocks. For example, the instruction relating to the frame frequency, the number of the drive lines and the data voltage switching timing is outputted to the timing generator 106, and the instruction relating to the driving voltage is outputted to the reference voltage generator 108. Note that the display data is temporarily stored in the register 103 and then is outputted to the memory controller 104 together with the instruction indicating a display position.

The memory controller 104 is a block which executes a write and read operation of the display memory 105. First, at the time of the write operation, a signal which selects an address of the display memory 105 is outputted on the basis of the instruction of the display position transferred from the register 103. At the same time, the display data is transferred to the display memory 105. By this operation, it is possible to write the display data in a predetermined address of the display memory 105. On the other hand, at the time of the read operation, an operation of sequentially selecting predetermined word lines in a word line group in the display memory 105 one by one is repeated. By this operation, it is possible to read the display data on the selected word line via a bit line all at once. Note that the setting of a range of the word line to be read, a period of one selection (equivalent to one scanning period), a repeating period of the selecting operation (equivalent to one frame period) and the like are indicated by the instruction.

The display memory 105 has a word line and a bit line corresponding to a scanning line and a data line of the display panel 114, and it executes the write operation and the read operation of the display data mentioned above. Note that the read display data is outputted to the multiplexer 107.

The timing generator 106 generates and outputs a signal group indicating one scanning period and one frame period by itself on the basis of a reference clock generated by a built-in oscillator, and it also outputs SR, SG and SB signals indicating output timings of the period P and the period D which are the feature of the present invention.

The multiplexer 107 is composed of switches for multiplexing the display data outputted by the display memory 105, and it selects the R data at the time when the SR signal is active ("High" level in this embodiment), selects the G data at the time when the SG signal is active, and selects the B data at the time when the SB signal is active, and outputs the selected data.

The reference voltage generator 108 is a block which generates a voltage level required in the drive circuit 101 from an input power supply voltage Vci. Note that the generation of the voltage level can be achieved by applying a charge pump circuit or the like.

The data voltage generator 109 divides a voltage inputted from the reference voltage generator 108 to generate a 64-level data voltage, and then outputs it to the data voltage selector 110.

The data voltage selector 110 selects one level from the 64-level data voltage in accordance with a value of the display data outputted by the multiplexer 107 and then outputs the selected one as the data voltage.

The operation amplifier 111 is a buffer for impedance conversion of the output of the data voltage selector 110, and is composed of voltage follower circuits.

The demultiplexer 112 is composed of switches for demultiplexing the data voltage outputted by the operation amplifier 111 and then outputting it to the data line, and it outputs the data voltage to the R line at the time when the SR signal is active ("High" level in this embodiment), outputs it to the G line at the time when the SG signal is active, and outputs it to the B line at the time when the SB signal is active, respectively.

The scanning line driver 113 is a block for sequentially outputting a scanning voltage ("High" level in this embodiment) which sets a pixel to a selected state in synchronous with one scanning period to a scanning line of the display panel 114 mentioned later. In this case, a timing at which the "High" level is outputted to a first scanning line is synchronized with a timing at which a first word line in the display memory 105 is read. Further, a switching timing of the line sequential output is slightly earlier than a start of one scanning period. This time difference is a so-called hold time, and the time difference is necessary for determining a writing voltage to the pixel in the display panel 114.

The display panel 114 is a flat panel of a so-called active matrix type, in which transistors for switching are disposed in each of the pixels positioned at the intersection points between the data lines and the scanning lines. A source terminal of the transistor is connected to an output of the demultiplexer 112 via the data line, and a gate terminal thereof is connected to an output of the scanning line driver 113 via the scanning line. Further, a drain terminal of the transistor is connected to a display element. Note that a common electrode is connected to an opposite side of the display element, and a voltage Vcom is outputted to the common electrode from the reference voltage generator 108. Accordingly, in the scanning line in a selected state, a difference between the data voltage and the voltage Vcom becomes an applied voltage to the display element. Note that, although a liquid crystal, an organic EL and the like are typical of the display element, other elements can be employed as long as a display brightness can be controlled by the voltage.

Next, an operation timing of the time-sharing drive in the drive circuit 101 will be described with reference to FIG. 2. First, the multiplexer 107 outputs the display data in the time-sharing manner in the order of B→G→R→G→B within one scanning period in conjunction with a "High" level of the signals SR, SG and SB mentioned above. In this case, in order to apply the same data voltage twice, the six phases of R→G→B→R→G→B may be first considered. However, the more the number of the phases is, the shorter the output period per one time is, and thus a time margin with respect to a data voltage settling is reduced.

For its prevention, in the present invention, the order of first output is set to B→G→R and the order of second output is set to R→G→B. By doing so, R in the first output and R in the second output are made in common so as to reduce one phase. Hereinafter, this method is called as a five-phase method. Further, the demultiplexer 112 outputs the data voltages VR, VG and VB in the order of B line→G line→R line→G line→B line in conjunction with the output of the multiplexer 107. Note that it is desirable that a length of each of the periods in the five-phase method can be changed by the instruction from the CPU 115, and it can be optimally set in accordance with the load of the display panel 114 to be driven.

As described above, at a time point at which the data voltage is applied to the R line (third phase), the original data voltage has been already pre-charged to the G line and the B line, and the original data voltage is then applied again to the G line and the B line. Accordingly, there is no potential fluctuation from the pre-charge voltage to the original data voltage. Further, since this operation can be achieved only by changing the timing of the signal of the timing generator 106, it is not necessary to add any new circuit. Accordingly, the display driver according to the present invention can achieve the object of the present invention, that is, it is possible to reduce the holding potential fluctuation of the data line without adding any new circuit and without depending on the display pattern.

Figure 2:
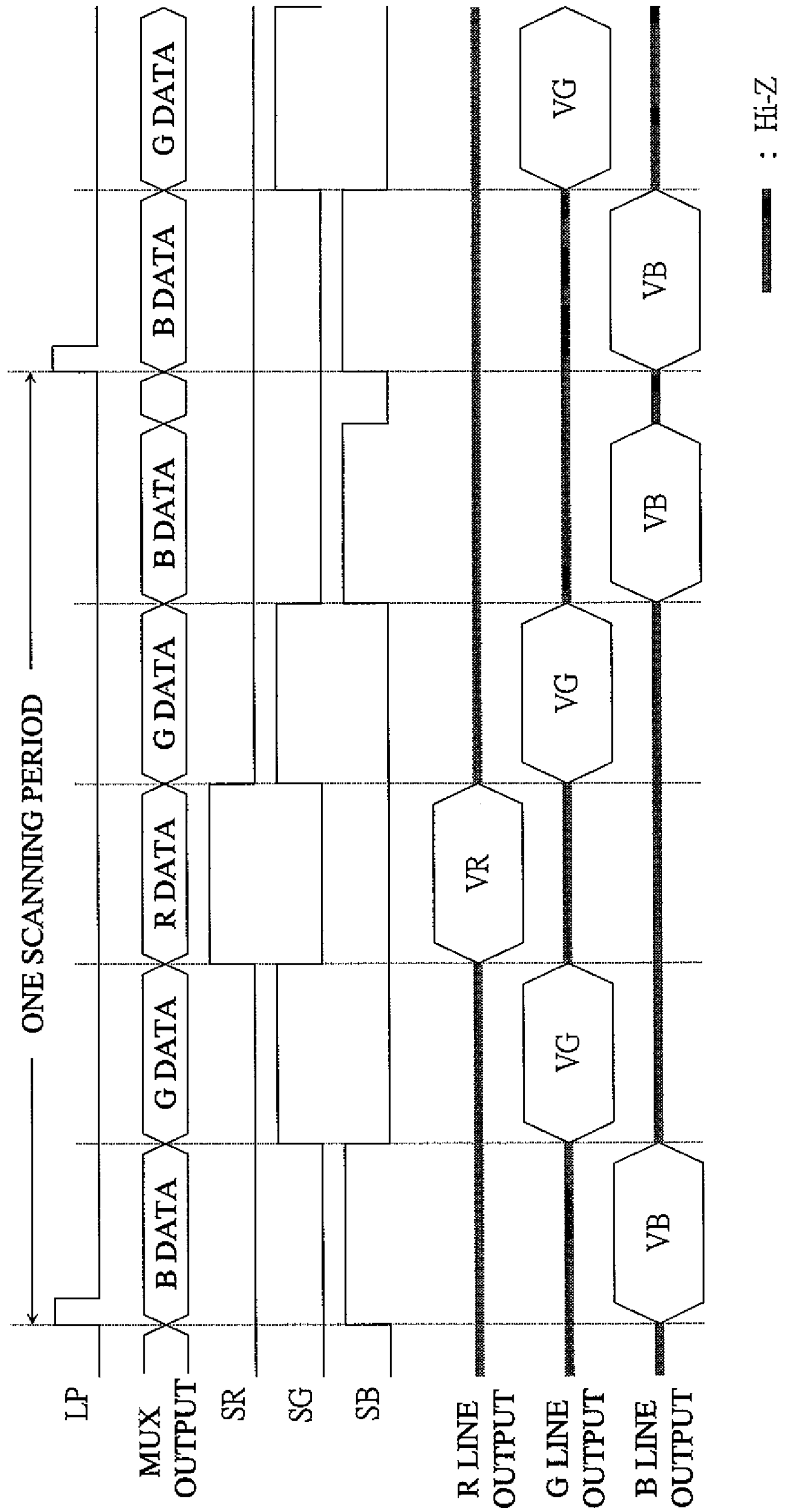
FIG. 2 is a diagram showing an operation timing of a time-sharing drive in a drive circuit in the display driver according to the first embodiment of the present invention.

Note that, in FIG. 2, at the last of one scanning period, a period in which the data voltage is not outputted to any data lines is provided. This is a period for securing the hold time described in the operation of the scanning line driver 113.

Note that, in this embodiment, the order for applying the data voltage is set to B→G→R→G→B. However, the order is not limited to this, but may be, for example, the order of R→G→B→G→R, or the like.

Second Embodiment

Next, a configuration and an operation of a display driver according to a second embodiment of the present invention will be described with reference to FIG. 3 to FIG. 5.

As described above, in the first embodiment of the present invention, the method in which the data voltage is applied in the order of B→G→R→G→B has been described. In this embodiment, the B line is driven just after starting the one scanning period, and since the outputs to the G line and the R line become high impedance in this period, the potential applied in the previous scanning period is held. In this case, assuming a so-called Vcom alternating current drive in which the voltage Vcom is alternated in each one scanning period, since the Vcom electrode and the data line are capacity-coupled to each other, the holding voltage of the data line transits in conjunction with the transition of the voltage Vcom, and the holding potential after the transition exceeds the amplitude range of the data voltage in some cases. In other words, in the Vcom alternating drive, since the holding potential of the data line fluctuates in accordance with the alternation of the Vcom, the potential difference from the data voltage which is applied next is extended, and it is expected that the time margin with respect to the settling of the data voltage is reduced.

Accordingly, in the second embodiment of the present invention, the fixed potential is pre-charged in the data line having a time until the first data voltage is applied after the start of one scanning period so as to reduce the potential difference from the original data voltage applied subsequently. By doing so, the settling time of the data voltage is hastened. Note that, as the fixed potential, the power supply voltage Vci which exists within the amplitude range of the data voltage and has a low output impedance is selected.

Figure 3:
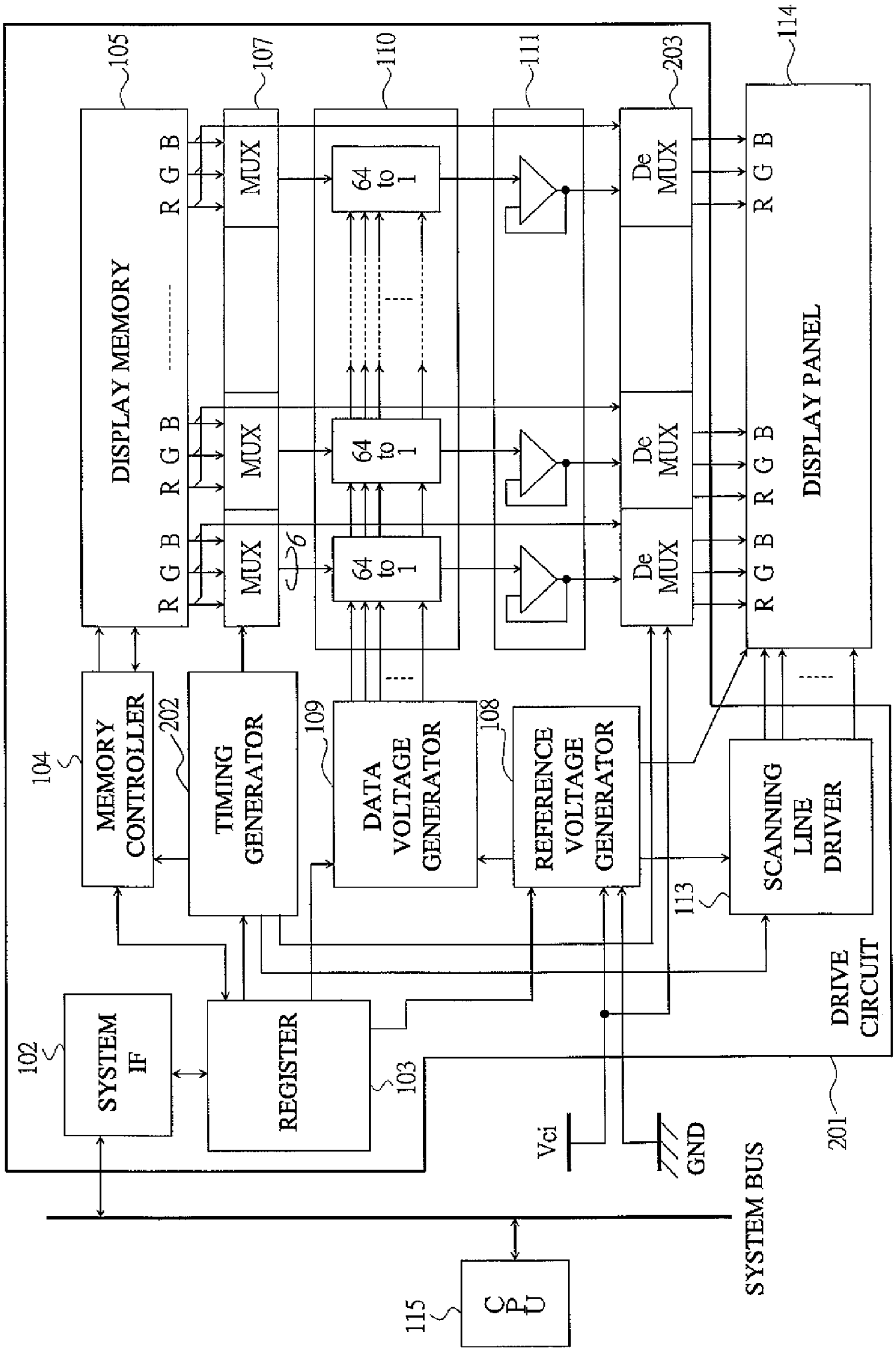
FIG. 3 is a diagram showing a block configuration of a display driver according to a second embodiment of the present invention.

FIG. 3 shows a block configuration of a display driver according to the second embodiment of the present invention. In FIG. 3, a reference numeral 201 denotes a drive circuit, 202 denotes a timing generator, and 203 denotes a demultiplexer. Since the other blocks are the same as the components in the first embodiment of the present invention shown in FIG. 1, the same reference numerals as those in FIG. 1 are attached thereto.

The timing generator 202 generates and outputs various timing signals by itself in the same manner as that of the timing generator 106 in the first embodiment of the present invention. A difference from the timing generator 106 exists in that the timing generator 202 in this embodiment generates and outputs PR, PG and PB signals indicating output timings in the period P.

Figure 4:
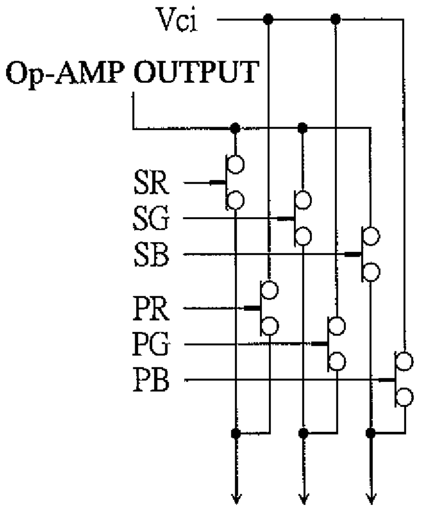
FIG. 4 is a diagram showing a configuration of a demultiplexer in the display driver according to the second embodiment of the present invention.
Figure 5:
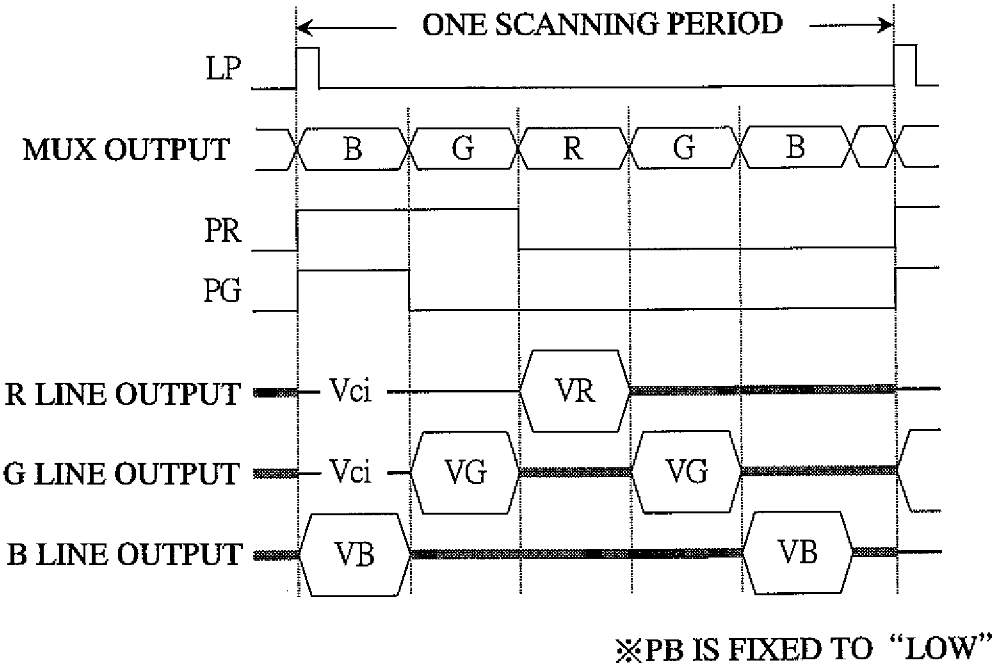
FIG. 5 is a diagram showing an operation timing of a time-sharing drive in a drive circuit in the display driver according to the second embodiment of the present invention.

As shown in FIG. 4, the demultiplexer 203 is composed of switches for demultiplexing the data voltage outputted by the operation amplifier 111 and then outputting it to the data lines, and switches for outputting the power supply voltage Vci which is the power supply voltage. The output operation of the data voltage is the same as that of the demultiplexer 112 in the first embodiment of the present invention, and an operation of outputting Vci to the R line at the time when the PR signal is active ("High" level in this embodiment), outputting Vci to the G line at the time when the PG signal is active, and outputting Vci to the B line at the time when the PB signal is active is added as a pre-charge function.

An operation timing of a time-sharing drive in the drive circuit 201 according to the second embodiment of the present invention will be described below with reference to FIG. 5. First, the multiplexer 107 outputs the display data in a time-sharing manner in the order of B→G→R→G→B within one scanning period in conjunction with a "High" level of the signals SR, SG and SB mentioned above. The demultiplexer 203 outputs the data voltages VR, VG and VB in the order of B line→G line→R line→G line→B line in conjunction with the output of the multiplexer 107. In this case, the signals PG and PR become "High" during the period until the VG and VR are outputted after the start of one scanning period, and the voltage Vci is outputted to the G line and the R line during this period. Accordingly, the Vci level is already pre-charged to the G line and the R line at the time when the first data voltage is outputted to the G line and the R line.

As described above, in the display driver according to the second embodiment of the present invention, in addition to the features of the first embodiment of the present invention, the fixed potential Vci is pre-charged to the data line having a time until the first data voltage is applied after the start of one scanning period. Accordingly, the potential difference between before and after the first data voltage is applied is reduced, and it is possible to hasten the settling time of the data voltage. Therefore, it is possible to improve the operation margin in the time-sharing drive.

Note that, although the level of the pre-charge is set to Vci in this embodiment, it is not limited to this, but the other voltage may be employed.

Third Embodiment

Next, a configuration and an operation of a display driver according to a third embodiment of the present invention will be described with reference to FIG. 6 to FIG. 8.

In the third embodiment of the present invention, two types of pre-charge levels are provided for the pre-charge level of the fixed potential described in the second embodiment of the present invention so as to further reduce the potential difference between before and after the first data voltage is applied, thereby achieving the further improvement of the operation margin in the time-sharing drive. In this embodiment, two types of pre-charge levels are the power supply voltages Vci and GND, and the pre-charge is controlled by using the display data.

Figure 6:
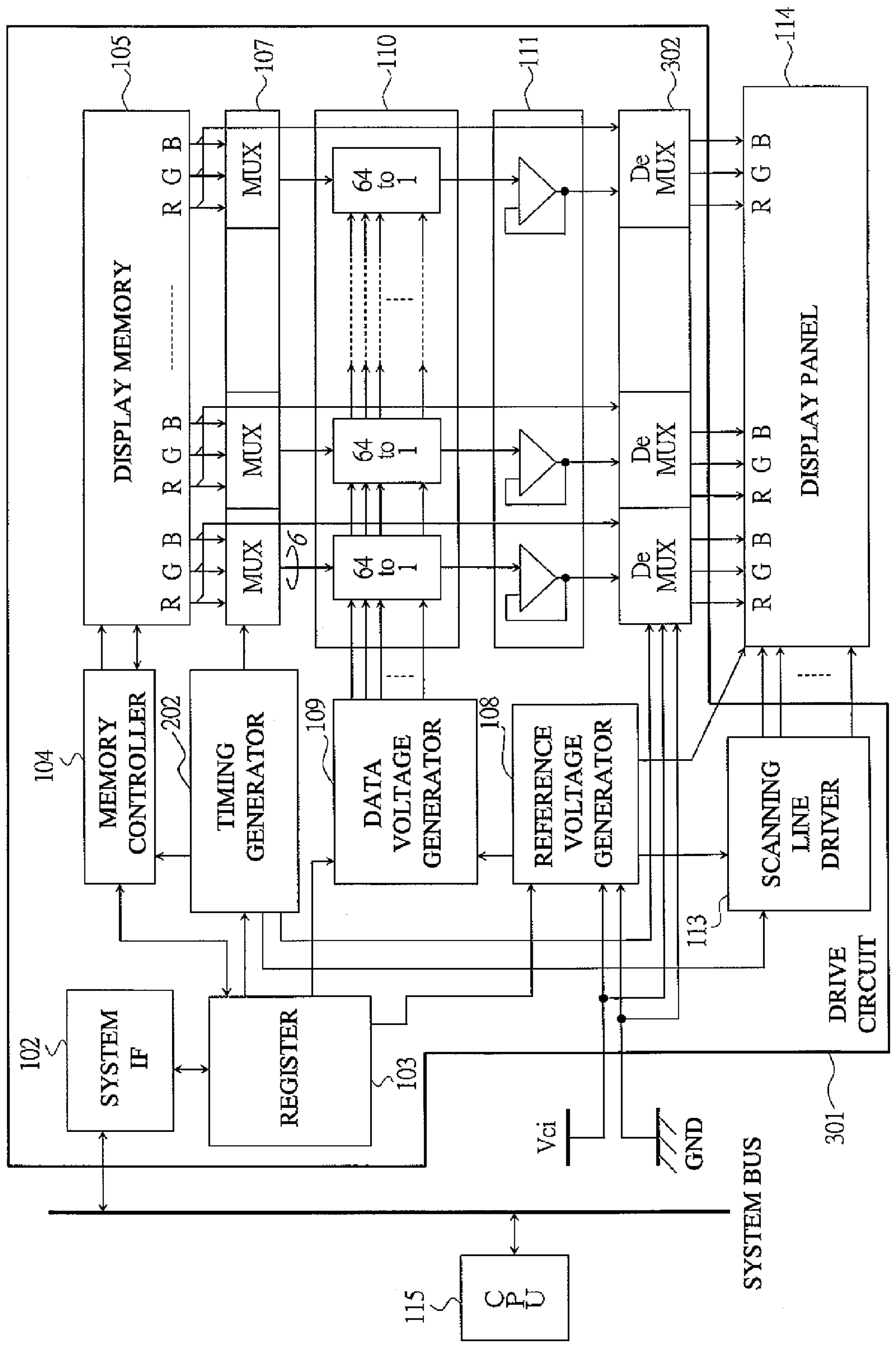
FIG. 6 is a diagram showing a block configuration of a display driver according to a third embodiment of the present invention.

FIG. 6 shows a block configuration of a display driver according to the third embodiment of the present invention. In FIG. 6, a reference numeral 301 denotes a drive circuit, and 302 denotes a demultiplexer. Since the other blocks are the same as the components in the second embodiment of the present invention shown in FIG. 3, the same reference numerals as those in FIG. 3 are attached thereto.

Figure 7:
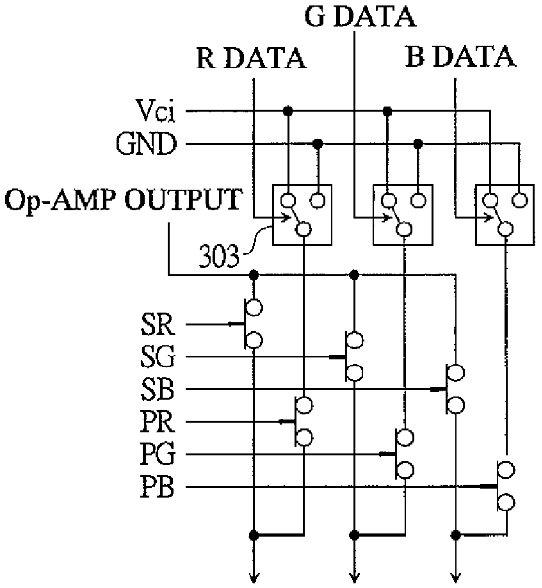
FIG. 7 is a diagram showing a configuration of a demultiplexer in the display driver according to the third embodiment of the present invention.

As shown in FIG. 7, the demultiplexer 302 is composed of switches for demultiplexing the data voltage outputted by the operation amplifier 111 and then outputting it to the data lines, switches 303 for selecting and outputting any one of the power supply voltages Vci and GND, and switches for outputting the selected power supply voltage. The output operation of the data voltage and the pre-charge operation are the same as those of the demultiplexer 203 in the second embodiment of the present invention.

Figure 8:
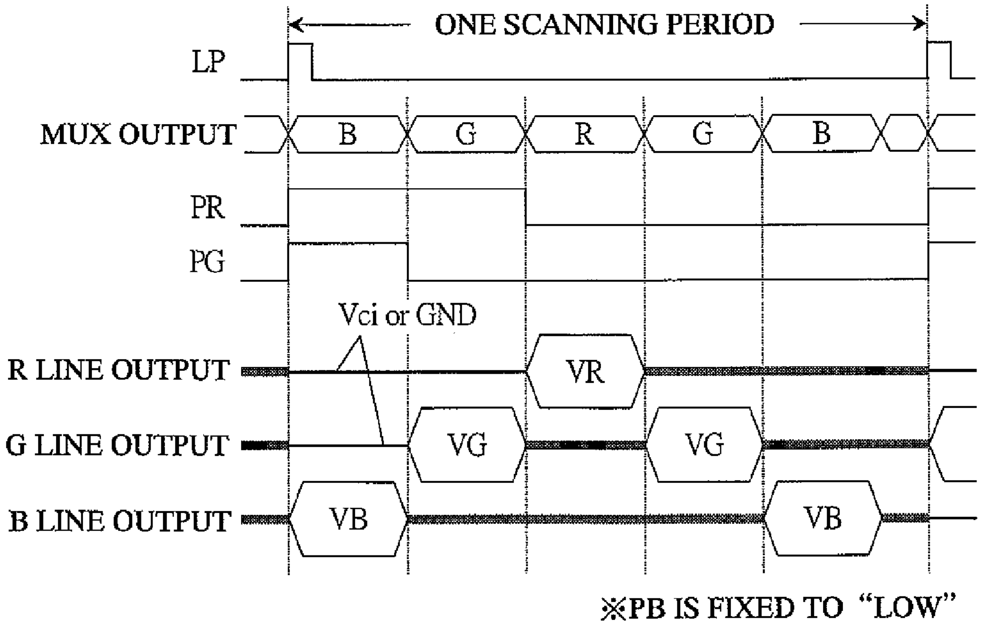
FIG. 8 is a diagram showing an operation timing of a time-sharing drive in a drive circuit in the display driver according to the third embodiment of the present invention.

In the operation timing of a time-sharing drive shown in FIG. 8, the selection switch 303 switches the power supply voltages Vci and GND in accordance with the display data. The simplest way to achieve this operation is to use the most significant bit of the display data. More specifically, the voltage GND is selected if the most significant bit is "0", and the voltage Vci is selected if the most significant bit is "1". In this case, however, the difference between the selected fixed voltage and the original data voltage is not always the minimum voltage difference. In this case, if threshold valves of the Vci and GND are determined by using the display data of plural bits, it is possible to reduce the difference between the fixed voltage and the original data voltage.

Further, in the case of the Vcom alternating drive, since the relation between the display data and the data voltage is reversed by the level of the voltage Vcom, it is not possible to determine the threshold values of Vci and GND only by the display data. In this case, by adding a signal which controls the level of the voltage Vcom to the determining conditions, a right threshold value can be determined.

As described above, in the display driver according to the third embodiment of the present invention, in addition to the features of the first and second embodiments of the present invention, the fixed potential of Vci or GND is pre-charged in accordance with the display data for the data line having a time until the first data voltage is applied after the start of one scanning period. Accordingly, the potential difference between before and after the first data voltage is applied is reduced, and it is possible to hasten the settling time of the data voltage. Therefore, it is possible to improve the operation margin in the time-sharing drive.

Note that, in this embodiment, two types of the pre-charge levels are Vci and GND. However, the pre-charge levels are not limited to these, but the other voltages may be used. Further, three of more types of pre-charge levels can be provided.

Fourth Embodiment

Next, a configuration and an operation of a display driver according to a fourth embodiment of the present invention will be described with reference to FIG. 9.

As described in the first to third embodiments of the present invention, the feature of the present invention is to perform the driving while dividing one scanning period into five phases. However, for example, in the case where the drive load of the data line is heavy, the settling time of the data voltage becomes long, and the data voltage can not be settled in one divided period in some cases. Accordingly, the fourth embodiment of the present invention shows an optimum driving method, in which the time of one divided period is extended by dividing one scanning period into four phases.

Figure 9:
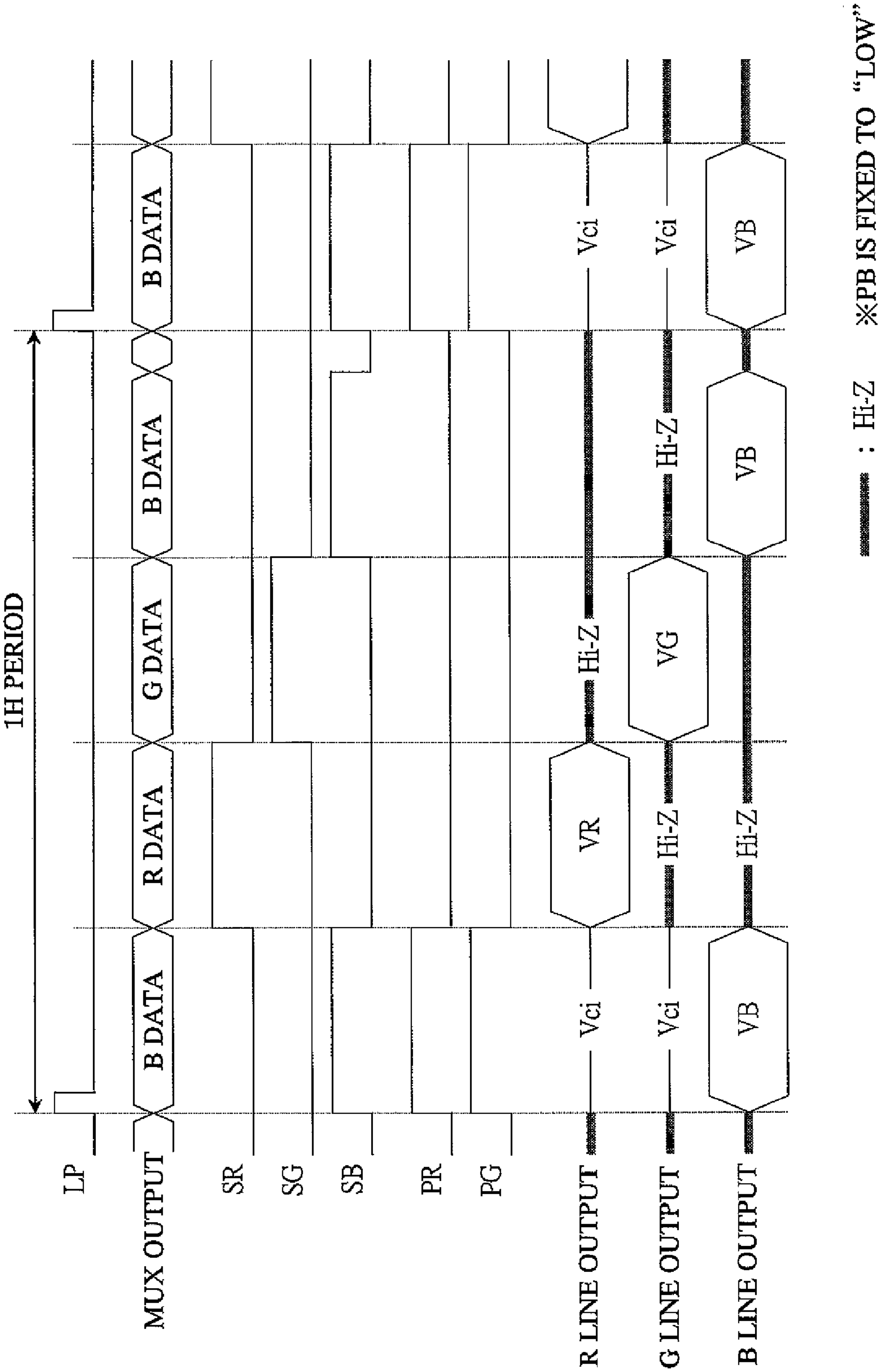
FIG. 9 is a diagram showing an operation timing of a time-sharing drive in a drive circuit in a display driver according to a fourth embodiment of the present invention.

FIG. 9 shows an operation timing of a time-sharing drive according to the fourth embodiment of the present invention. Note that, since a block configuration of the display driver described in this embodiment is the same as that shown in FIG. 3, the description thereof will be omitted here, and the operation will be described with reference to FIG. 3. First, the multiplexer 107 outputs the display data in a time-sharing manner in the order of B→R→G→B in one scanning period in conjunction with a "High" level of the signals SR, SG and SB mentioned above. The demultiplexer 203 outputs the data voltages VR, VG and VB in the order of B line→R line→G line→B line in conjunction with the output of the multiplexer 107. In this case, the signals PR and PG become "High" during the period until the VR and VG are outputted after the start of one scanning period, and the voltage Vci is applied to the R line and the G line during this period. In other words, the first data voltage application to the G line (second phase) is omitted from the five-phase method mentioned above. Hereinafter, this method is called as a four-phase method.

Figure 10:
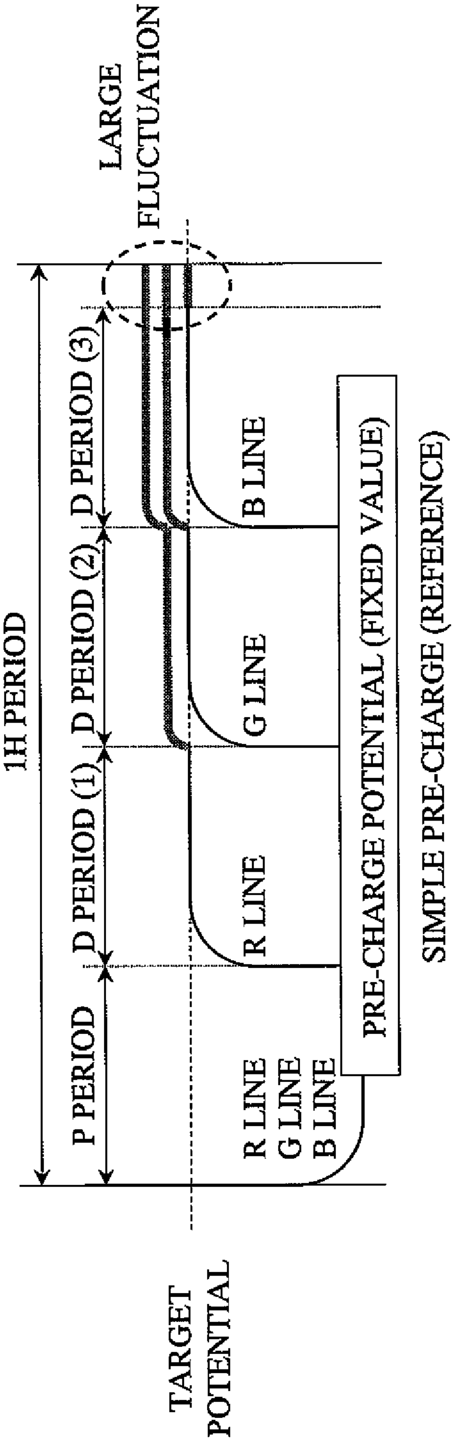
FIG. 10 is a diagram showing a simple pre-charge, in which images of a fluctuation amount of a data line holding potential in each method are shown, in the display drivers according to the first to fourth embodiments of the present invention.

Note that FIG. 10 to FIG. 12 are diagrams showing the images of the fluctuation amount of the data line holding potential in each of the methods. As shown in FIG. 12, in the case of the four-phase method, since the data voltage is applied to the G line only once, the holding voltage of the R line in which the voltage application has been already completed is fluctuated due to this voltage application. However, in comparison with a simple method in which all of the RGB lines are pre-charged to the fixed potential shown in FIG. 10, the peak of the data line holding potential fluctuation can be reduced to a half at the time when one scanning period is finished. Note that FIG. 11 shows a case of the five-phase method, in which the fluctuation of the data line holding potential is not observed.

In the display driver according to the fourth embodiment of the present invention mentioned above, in the case of the driving while dividing one scanning period into four phases, the original data voltage has been already pre-charged to the B line at the time point when the data voltage is applied to the R line (second phase), and thereafter the original data voltage is applied to the G line and the B line. Accordingly, the potential fluctuation from the pre-charge voltage to the original data voltage does not occur in the B line. Therefore, in comparison with the simple system in which all of the RGB lines are pre-charged to the fixed potential, the holding potential fluctuation of the data line can be reduced.

Note that, in this embodiment, the output order to the data line is the order of B→R→G→B. However, the order is not limited to this, but the order of R→B→G→R or the like may be employed.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, in all of the embodiments of the present invention, although the number of the data lines of one block is set to three, it is not limited to this, but may be set to N (N is an integral number equal to or more than 2).

Further, although the tone information included in the display data is set to 6 bits in each of RGB (64 tones), it is not limited to this.

Further, in the embodiments, components such as the data voltage selector, the operation amplifier, the demultiplexer and the like are provided in the drive circuit. However, the configuration is not limited to this, but they may be provided on the display panel 114 side.

Further, the switch of the operations of the first to fourth embodiments of the present invention by means of the instruction from the CPU or the like can be easily realized, and the switch to a three-phase method in which the precharge is not executed is also possible.

Further, the description of the embodiments of the present invention has been made on the premise that information such as the drive timing or the like is stored in the register. However, the configuration is not limited to this, but a terminal setting may be employed.

Further, the methods of the first to fourth embodiments of the present invention, that is, the various modes for applying the data voltage to the data line group constituting one block in the time-sharing manner can be set from the external CPU 115 to the register 103 so as to make the various modes exchangeable.

The present invention relates to a display driver for an active matrix display using the TFT liquid crystal or the like, and it is effectively applied to the driving method and the drive circuit which can suppress the fluctuation of the data voltage held in the data line, in the drive system in which the data voltage is outputted in a time-sharing manner in one horizontal period.

What is claimed is:

1. A display driver which applies a scanning voltage for setting a pixel to a selected state to a scanning line of a display panel in each one scanning period and applies a data voltage corresponding to a display data to a data line of the display panel, the display driver comprising:

a circuit which applies the data voltage to a first data line connected to a first pixel among a red pixel, a green pixel and a blue pixel on the display panel in a first period of the one scanning period, applies the data voltage to a second data line connected to a second pixel among the red pixel, the green pixel and the blue pixel on the display panel in a second period of the one scanning period, applies the data voltage to a third data line connected to a third pixel among the red pixel, the green pixel and the blue pixel on the display panel in a third period of the one scanning period, and applies the data voltage to the second data line on the display panel in a fourth period of the one scanning period.

2. The display driver according to claim 1, wherein the circuit applies a common precharge voltage to the second data line and the third data line in the first period.

3. A display driver which applies a scanning voltage for setting a pixel to a selected state to a scanning line of a display panel in each one scanning period and applies a data voltage corresponding to a display data to a data line of the display panel, the display driver comprising:

a circuit which applies the data voltage twice to a first data line connected to a first pixel among a red pixel, a green pixel and a blue pixel on the display panel in a first period of the one scanning period, applies the data voltage once to a second data line connected to a second pixel among the red pixel, the green pixel and the blue pixel on the display panel in a second period of the one scanning period, and applies the data voltage once to a third data line connected to a third pixel among the red pixel, the green pixel and the blue pixel on the display panel in the second period of the one scanning period.

* * * * *